April 26, 1927.

G. G. KRIVOSHEIN 1,626,241

COMBINED SUSPENSION AND ARCH BRIDGE

Filed July 26, 1926　　6 Sheets-Sheet 1

Inventor.
Gregory G. Krivoshein
by Heard Smith & Tennant.
Attys.

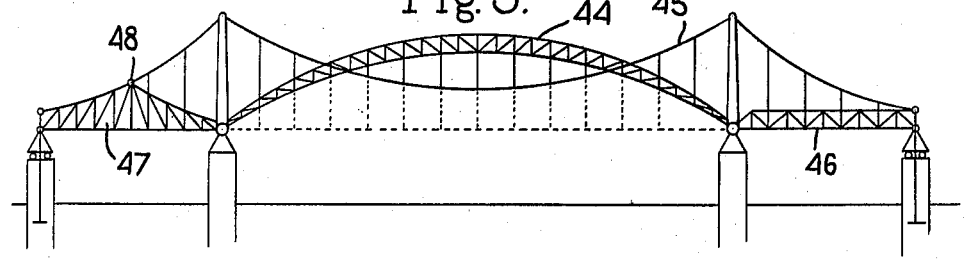
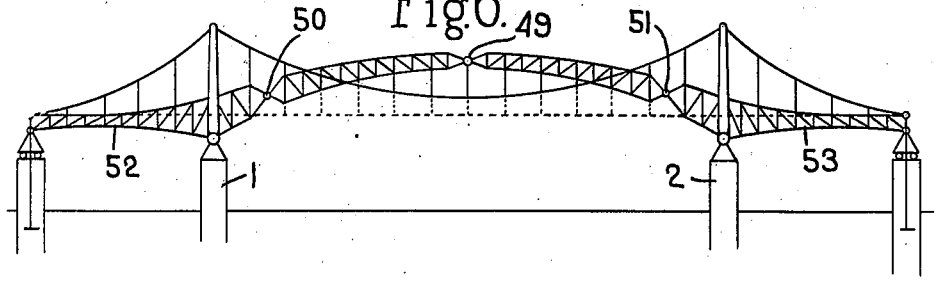
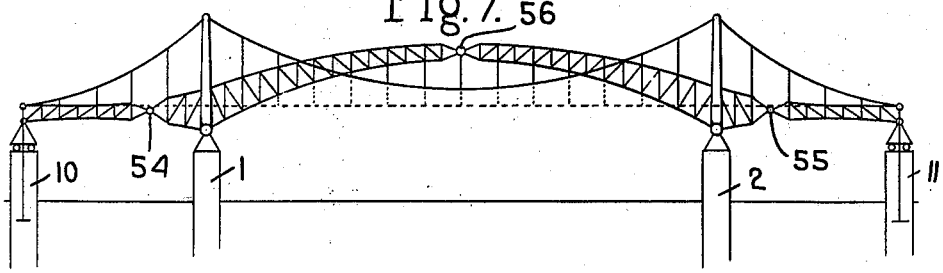
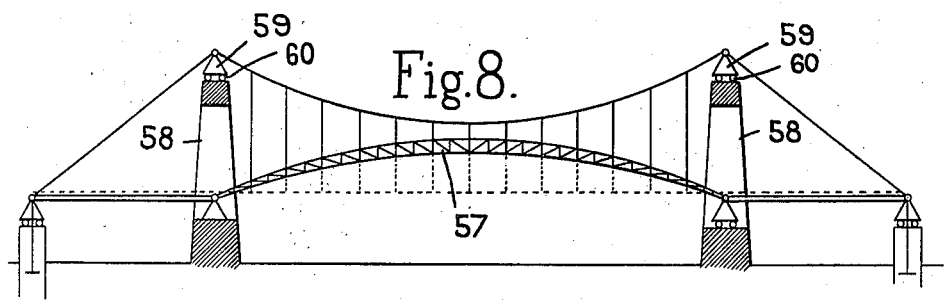

April 26, 1927.

G. G. KRIVOSHEIN

COMBINED SUSPENSION AND ARCH BRIDGE

Filed July 26, 1926    6 Sheets-Sheet 3

1,626,241

Inventor.
Gregory G. Krivoshein
by Heard Smith & Tennant.
Attys.

April 26, 1927.
G. G. KRIVOSHEIN
1,626,241
COMBINED SUSPENSION AND ARCH BRIDGE
Filed July 26, 1926   6 Sheets-Sheet 4
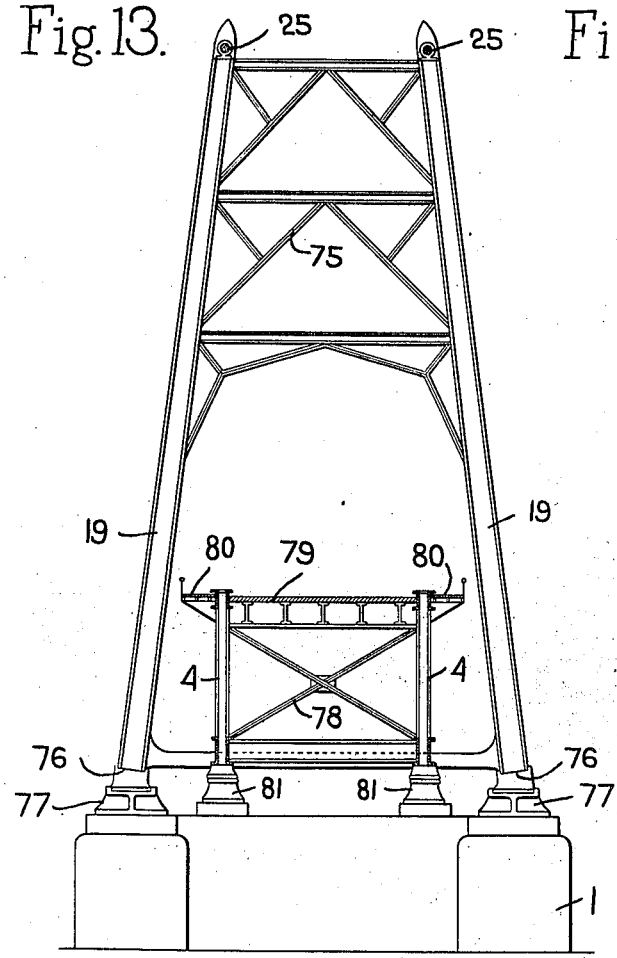
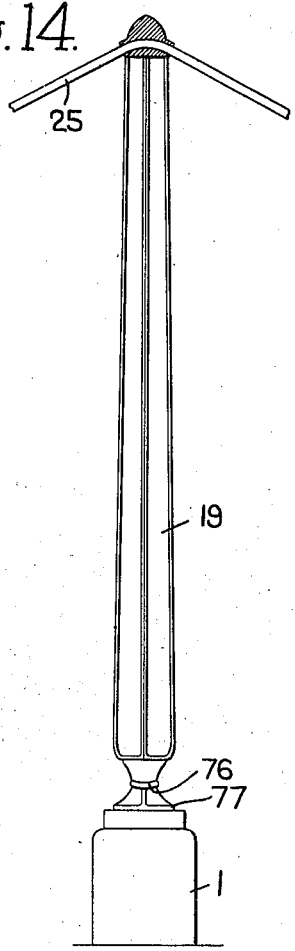
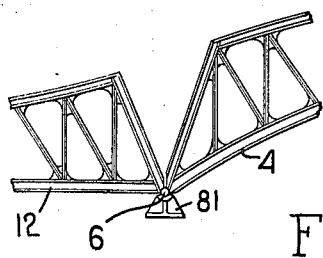
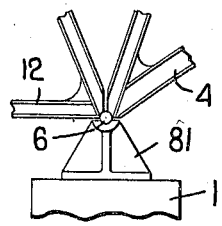
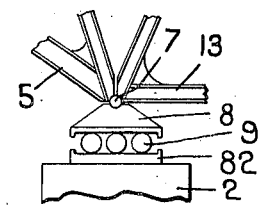
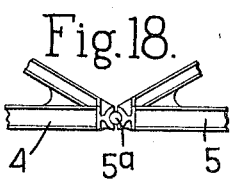
Inventor.
Gregory G. Krivoshein
by Heard Smith & Tennant.
Attys.

April 26, 1927.
G. G. KRIVOSHEIN
1,626,241
COMBINED SUSPENSION AND ARCH BRIDGE
Filed July 26, 1926   6 Sheets-Sheet 5
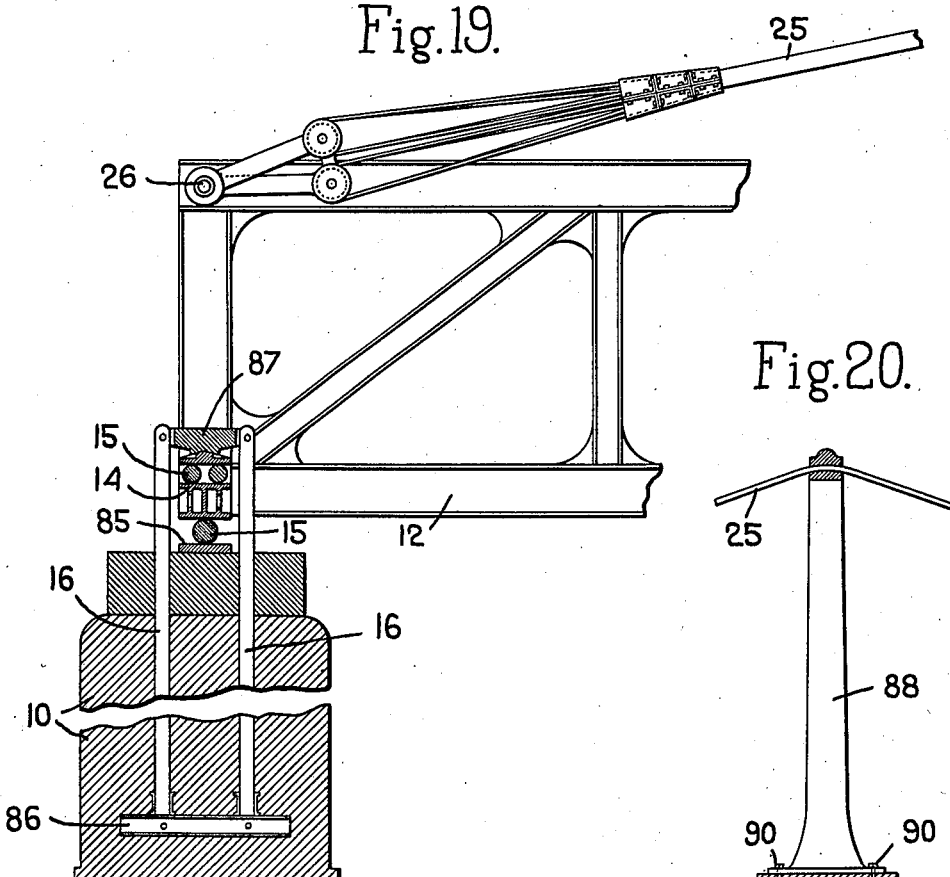
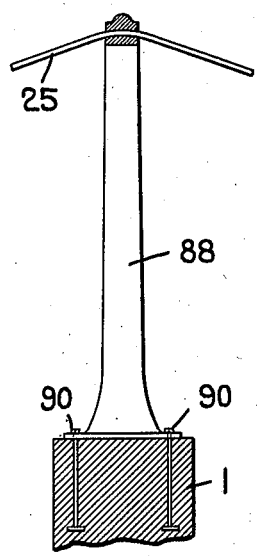
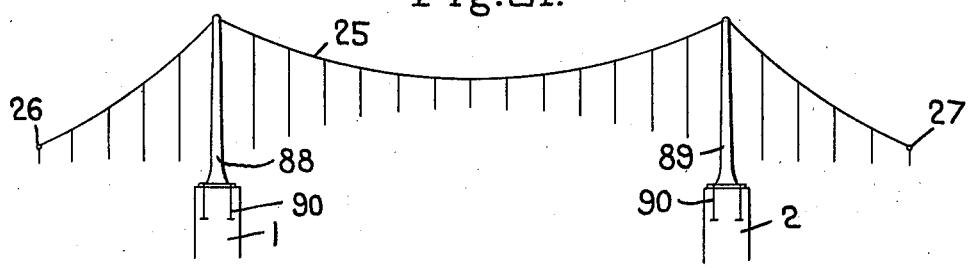
Inventor.
Gregory G. Krivoshein
by Heard Smith & Tennant.
Attys.

April 26, 1927.

G. G. KRIVOSHEIN 1,626,241

COMBINED SUSPENSION AND ARCH BRIDGE

Filed July 26, 1926   6 Sheets-Sheet 6

Inventor.
Gregory G. Krivoshein
by Heard Smith & Tennant
Attys.

Patented Apr. 26, 1927.

1,626,241

UNITED STATES PATENT OFFICE.

GREGORY G. KRIVOSHEIN, OF PRAGUE, CZECHOSLOVAKIA, ASSIGNOR OF ONE-HALF TO JOHN R. FREEMAN, OF PROVIDENCE, RHODE ISLAND.

COMBINED SUSPENSION AND ARCH BRIDGE.

Application filed July 26, 1926. Serial No. 124,795.

This invention relates to a bridge construction in which the principles of the arch bridge and the suspension bridge are combined to present a novel, economical and efficient unitary bridge construction.

The object of the invention is to provide such a combined chain and arch bridge construction in which one, and preferably both, ends of the bridge are self-anchored, thus eliminating end thrust on the abutment or abutments.

The object of the invention is further to provide a combined chain and arch bridge in which the chain and the arch cooperate efficiently in sustaining the load and in which deformations due to changes in temperature or other conditions are minimized and efficiently distributed between the chain and the arch elements.

The object of the invention is further to provide a combined chain and arch bridge construction in which the chain and arch elements are connected at regular intervals by vertical stress members which are always under tension.

The object of the invention is further to provide a combined chain and arch bridge in which each, and preferably both, end spans are constituted as strut members and preferably as arch sections vertically anchored at their outer ends and to which the end or ends of the chain are connected thus eliminating end thrust on the abutment or abutments, and in which deformations due to changes in temperature are minimized and efficiently distributed between the chain and arch elements.

The object of the invention is further to provide a self-anchored combined chain and arch bridge in which the rise of the arch and the drop of the chain are so correlated that the stress of the chain is materially less than in an ordinary self-anchored suspension bridge with a stiffening girder and preferably in which the rise of the arch and the drop of the chain are equal and the stress in the chain is twice less than in the ordinary self-anchored suspension bridge with the stiffening girder.

The object of the invention is further to provide a combined chain and arch bridge in which the chain supporting towers are preferably mounted to oscillate on their piers although they may be fixed immovably thereon.

These and other objects and features of the invention will appear more fully from the accompanying description and drawings and will be particularly pointed out in the claims.

As the main features of the invention relate to principles of construction, the drawings are chiefly in diagrammatic form and it will be understood that constructional details may be varied as desired and in accordance with engineering practice.

The suspension element of the bridge is herein designated by the term "chain", but by this term is to be understood any suitable suspension element, whether of the cable, chain link, eye-bar or other type.

While the main or central portion of the bridge in all cases has been shown as comprising two piers supporting the main arch and the chain, it will be obvious that this main span may be repeated as many times as required without altering the broad principles of the invention.

In the drawings:

Figs. 1 to 9, inclusive, are diagrammatic views of various forms of bridges embodying the invention.

Fig. 13 is a view in transverse vertical cross section taken adjacent the left-hand pier of Fig. 1 showing some of the details of construction of a preferred form of the bridge.

Fig. 14 is a side elevation partially in vertical cross section of the construction shown in Fig. 13.

Fig. 15 is a detail in side elevation to illustrate the pivotal connection between the left-hand side arch section and the main arch of a construction such as shown in Fig. 1.

Fig. 16 is a similar detail on a larger scale.

Fig. 17 is a similar detail showing the connection between the main arch and the right-hand side arch section.

Fig. 18 is a similar detail showing the connection at the center of the main arch sections.

Fig. 19 is a detail in side elevation and partially in vertical cross section showing a simple and preferred form of construction at the left-hand abutment.

Fig. 20 is a view similar to Fig. 14 of a tower of the type immovably mounted on its pier.

Fig. 21 is a view similar to Fig. 10 with the towers of the type immovably mounted on their piers.

It will be unnecessary to illustrate or describe in detail the construction of a bridge embodying the principles of the invention as it may take various forms and the details will depend upon the dimensions of the structure and will readily be understood by those familiar with engineering practice. The main feature of the invention resides in the combination of the suspension principle, the arch principle and the self-anchoring principle.

Figure 1:
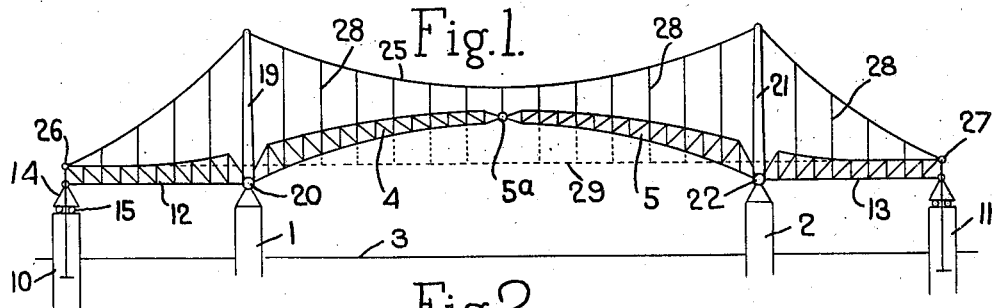
Figure 10:
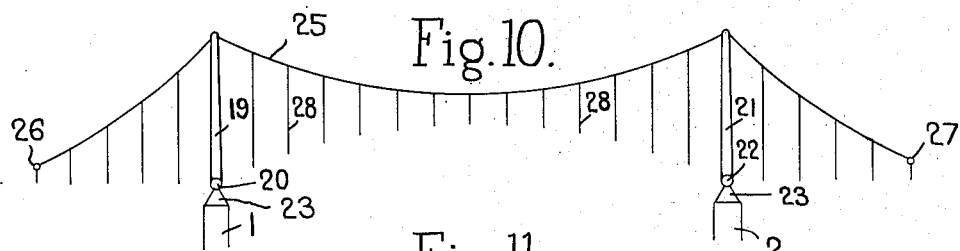
Fig. 10 is a diagrammatic view showing the suspension element of the construction shown in Fig. 1 separately.
Figure 11:
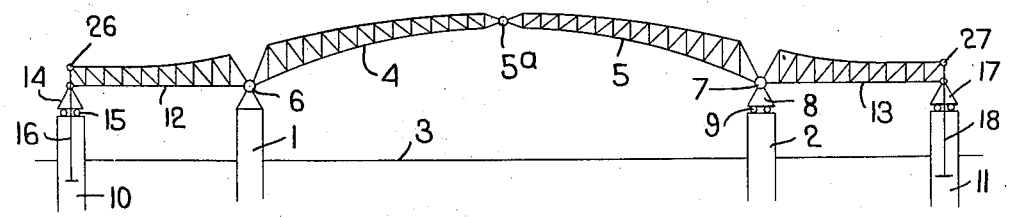
Fig. 11 is a diagrammatic view showing the arch elements of the construction shown in Fig. 1 separately.

In Fig. 1 there is illustrated diagrammatically a bridge embodying a preferred form of the invention designed for one main span and two side or shorter spans and the suspension and arch elements are shown separately in Figs. 10 and 11. Two piers, 1 and 2, of the required size and height and materials are built up from suitable foundations above the surface 3 to be bridged over. The main arch extends between the piers 1 and 2 and in this form is shown in two similar sections 4 and 5 and is preferably formed of structural steel in the usual manner. These arch sections are pivoted together at the center at 5ª. The arch section 4 is pivotally supported at 6 in a fixed bearing on the pier 1. The arch section 5 is pivotally supported at 7 on a sliding bearing 8 shown as mounted on rollers 9 on the pier 2. Thus provision is made for expansion and contraction of the arch.

Two abutments are shown, 10 at the left-hand end of the bridge and 11 at the right-hand end. These abutments may be built in much the same form as the piers and are of a comparatively light construction because with this type of bridge they do not take end thrust.

Suitable thrust members are secured to the ends of the main arch and in this form they are shown as the side arch sections 12 and 13. In the construction illustrated, these sections are practically straight, or in the form of skeleton girders. The arch section 12 is pivotally mounted on the same pivotal axis 6 as the end of the arch section 4 and at its free end is supported upon a sliding bearing 14 shown as mounted on the rollers 15 on top of the abutment 10. This bearing is also anchored, as indicated at 16, against vertical movement. The sliding bearing 14 provides for the expansion and contraction of the side arch 12. The side arch 13 is similarly mounted on a sliding bearing 17 anchored against vertical movement at 18 to the abutment 11.

The suspension member of the bridge, shown separately in this form of construction in Fig. 10, involves towers mounted on the piers 1 and 2. Preferably these towers are constructed to oscillate on fixed bearings on the piers. The tower 19 is shown pivoted at 20 on a fixed bearing 23 on the pier 1, thus enabling it to oscillate. The tower 21 is shown as pivoted at 22 on a fixed bearing 23 on the pier 2. In this case both bearings of the towers are placed independently from the bearings of the arch. The suspension element or chain 25 extends over the top of the towers, having a properly shaped saddle thereon, and depends between the towers. The ends of this chain are suitably anchored and, in the construction illustrated in Fig. 1, are anchored at 26 to the end of the thrust member or side arch 12 and at 27 to the end of the thrust member or side arch 13.

The arch and suspension elements are connected at regular intervals by suitable vertical stress members 28 which are constructed to take tension at all times.

The floor structure 29 extends at any suitable level above the piers and is supported preferably at the points of connection between the vertical stress members and the arch.

Figure 12:
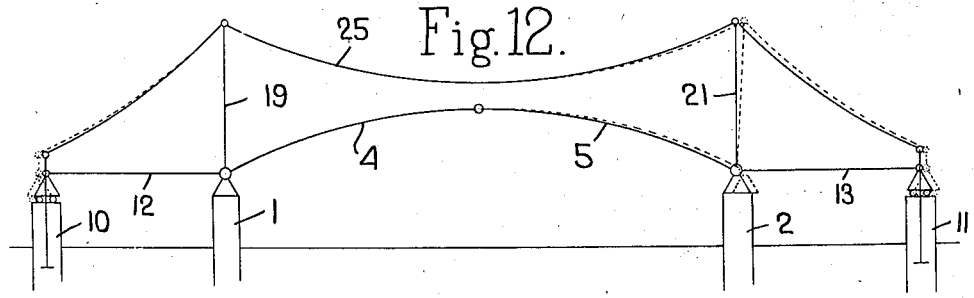
Fig. 12 is a diagrammatic view illustrating the deformation of the construction shown in Fig. 1 due to expansion.

The general movement of the bridge under expansion and contraction is shown in Fig. 12, the dotted lines indicating the positions the elements take upon expansion. The pivoting of the towers on their bearings also enables the towers to oscillate and take care of deforming stresses.

It will be seen that the bridge is self-anchored in that the side arches 12 and 13 act as struts with their free ends held against vertical movement so that the pull exerted by the chain is resolved into forces acting lengthwise of these strut members and vertically on the abutments. Thus there is eliminated any end or side thrust on the abutments such as takes place with ordinary types of arch bridge. The vertical reaction on the abutments depends upon the angle between the end of the chain and the horizontal and consequently when this angle is small, this reaction is small. Thus the anchoring weight of the abutment is controlled.

A bridge embodying the principle of this invention has certain distinctive properties which are illustrated in the diagrams of Figs. 22 to 25. Assuming, for example, that the rise 30 of the arch is equal to the drop 31 of the chain, it will be found that the stress of the chain is twice less than in ordinary suspension bridges with simple stiffening girders.

Figure 22:
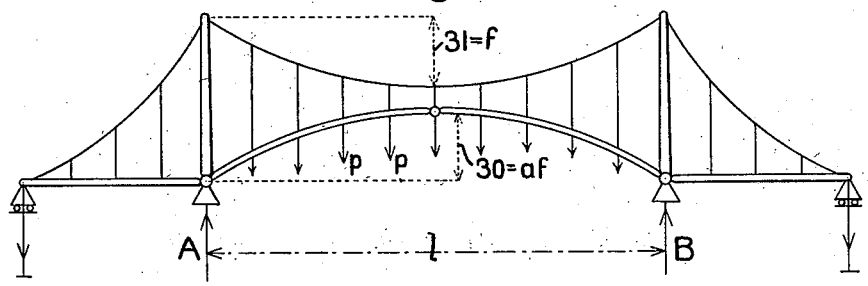
Figs. 22 to 25 are diagrammatic views of a bridge construction of the type illustrated in Fig. 1 to indicate the application of the stresses.
Figure 23:
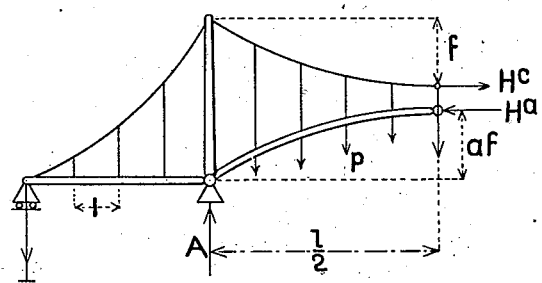

In Fig. 22 is shown diagrammatically the statically determinate system of the invention, that is, in the case of the self-anchored combined chain and arch bridge with the main arch pivoted in two sections at the ends and at the center. The equation of equilibrium of the left half of the bridge is, Fig. 23;—$H^c - H^a = 0$ from which we find: $H^c = H^a = H$ that is, the horizontal stress $H^c$ in the chain is equal to the horizontal stress $H^a$ in the arch.

Figure 24:
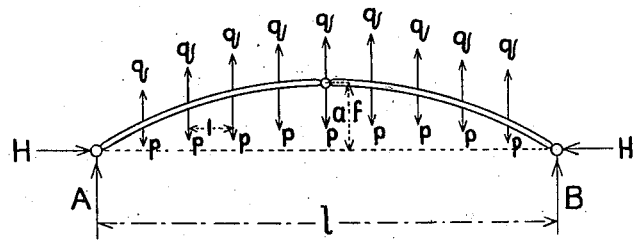

Consider now the equilibrium of the entire arch, see Fig. 24. Let it be assumed that:

$H$ = the horizontal reaction of the arch.
$A$, $B$ = the vertical reactions of the arch.
$p$ = the load.
$q$ = the stress of the vertical stress members per unit of length.
$l$ = the length of the span.
$af$ = the rise of the arch.
$f$ = the drop of the chain.

The equation of the equilibrium of the arch then is:

$$A = B - (p-q)\frac{l}{2}$$

The equation of the equilibrium of the chain is:

$$H = \frac{ql^2}{8f}$$

Figure 25:
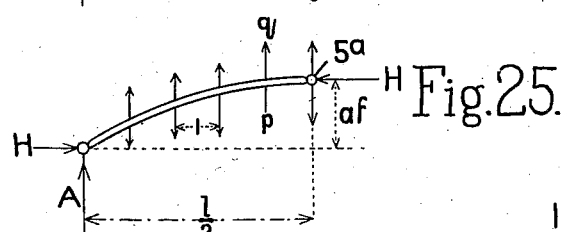

Consider now the equilibrium of the left half of the arch, see Fig. 25. The equation of moments about the middle pivotal axis, 5ᵃ, is:

$$\frac{Al}{2} + \left[(q-p)\frac{l}{2}\right]\frac{l}{4} - Haf = 0$$

Substituting in this equation the values of $A$ and $q$ obtained from the previous equations we have:

$$H = \frac{Pl^2}{8f(1+a)}$$

If, as assumed, the rise of the arch $af$ is equal to the drop of the chain $f$, that is, $af$ equals $f$, or $a$ equals 1, it follows that the horizontal stress in the chain is:

$$\bar{H} = \frac{1}{2} \times \frac{pl^2}{8f}$$

that is, the horizontal stress in the chain of the self-anchored combined chain and arch bridge is twice less than in ordinary suspension bridges with stiffening girders.

Consequently the stress in the vertical stress members and the compression stresses in the towers are in this case twice less than in ordinary suspension bridges. The horizontal compression stress in the arch is in this case also twice less than in ordinary self-anchored suspension bridges with a simple stiffening girder. Thus the present invention gives great economy in the material required.

The stresses $q$ in the vertical stress members connecting the arch and chain in this invention are always tension stresses. If the chain crosses the arch, the stresses in the members under the arch and above the chain are compression stresses, but the loads are always sufficiently great to make the algebraic sum of the stresses tension stresses.

Figure 2:
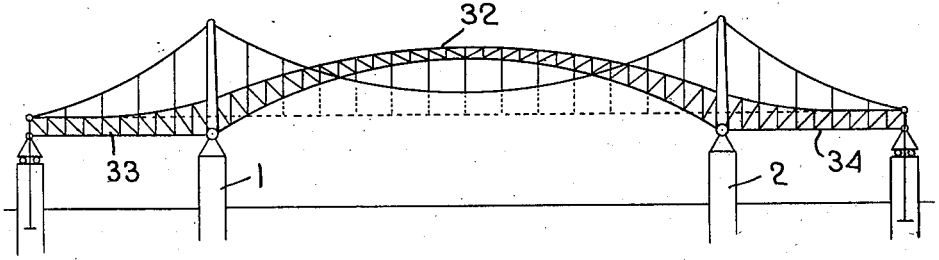

Within the principles of the invention there may be many variations in the construction. In Fig. 2 the main arch 32 extending between the piers 1 and 2 is not pivoted at its center but is a continuous structure and the side strut members 33 and 34 are rigidly continuous with the central arch. The proportions are also such that the chain crosses the arch. Otherwise the structure is similar to that already described.

Figure 3:
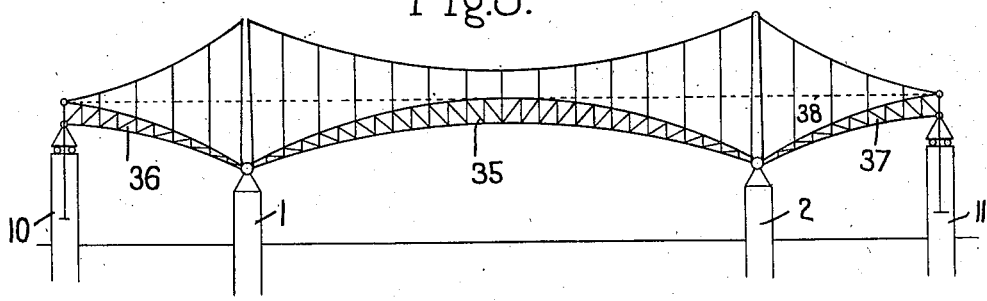

In Fig. 3 the central arch structure 35 is a continuous arch pivoted at its ends on the bearings on the piers 1 and 2, while the side arches 36 and 37 are semi-arch sections pivoted at the piers to the central arch section and springing up and anchored at their free ends to the sliding bearings on the abutments 10 and 11. This enables the floor line 38 of the bridge to be carried at a higher level above the piers, but the principles of the stresses are substantially the same.

Figure 4:
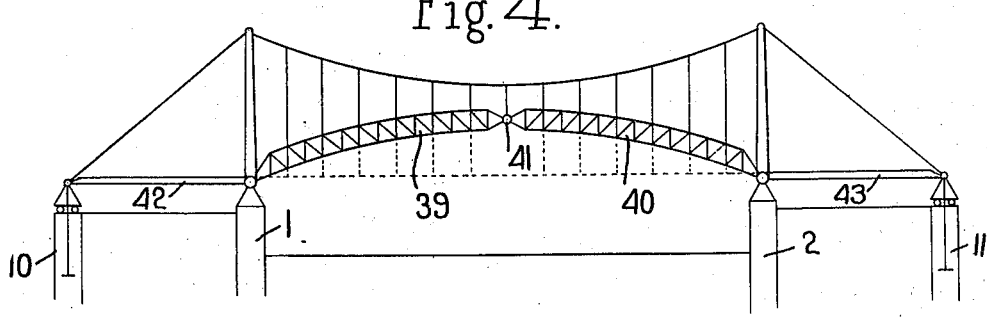

In Fig. 4 the central arch portion is in the form of two arch sections 39 and 40 pivoted at 41 at the center and pivotally mounted at their ends on the bearings on the piers 1 and 2. The strut members 42 and 43 are simple girders or struts for performing the self-anchoring function and extend from the pivots at the end of the arch to the bearings on the abutments 10 and 11.

In Fig. 5 the central arch section 44 is of the type shown in Fig. 3 and similarly mounted, but in this case the chain 45 crosses the arch. This strut member 46 at the right is in the form of a truss and at the left this truss 47 is of a different shape and the chain, instead of extending to the extreme end of the truss, is connected to the middle at 48.

In Fig. 6, the central arch section has three pivotal points 49 at the center and 50 and 51, each located at a substantial distance in the span from the piers 1 and 2. The strut members 52 and 53 are built continuously with those portions of the central arch extending to the pivots 50 and 51, respectively. The chain crosses the arch.

In Fig. 7, the construction is similar to that shown in Fig. 6 with the exception that the pivotal points 54 and 55 in the arch element of the bridge are between the pier 1 and the abutment 10 and the pier 2 and the abutment 11, respectively. The structure in the central arch sections therefore extends continuously across the piers between the central pivot 56 and the pivotal points 54 and 55.

In Fig. 8, the construction is similar to that shown in Fig. 4, excepting that the central arch 57 has no central pivot and the tower construction is different. In this case the towers 58 are built up from the piers and sliding bearings 59 for the chain are mounted on rollers 60 on the top of the towers.

Figure 9:
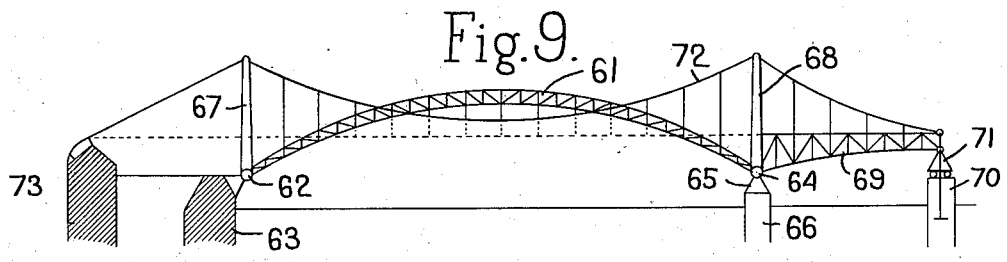

In Fig. 9, the construction is designed to illustrate a central span and a span at one side only. In this case the central arch section 61 is pivoted at one end 62 on an abutment 63 adapted to take some side thrust and its other end is pivoted on a sliding bearing on a pier 66. One tower 67 is mounted to oscillate at 62, while the other tower 68 is mounted to oscillate at 64 on the fixed bearing 65. At the right-hand end the half span is covered by a side arch section 69 vertically anchored to the abutment 70 through the sliding bearing 71. The chain 72 extends from the end of the side arch section 69 over the towers and is carried down and vertically anchored at 73 in an abutment 74, the sole purpose of which is to anchor the chain end vertically. The reactions at the right-hand side of the bridge are similar to those already described, but at the left-hand side the self-anchoring feature is absent because the abutment 63 takes the reaction from the arch and the abutment 74 that from the chain.

The sliding bearings for the arch on one of the piers, such as the right hand pier, in the constructions shown in Figs. 1 to 7 and 9 may be the same as shown in Fig. 11.

Where the chain is not used to support the load, as in the construction shown in Figs. 4, 8 and at the left of Fig. 9, it takes the form substantially of a straight line, but where it is connected by the vertical stress members with the central arch and the side arches or side strut members, it takes a parabolic or catenary form.

While, as already stated, the construction and details will be varied with engineering practice and will be readily understood, there are herein shown a few details of structure for illustrative purposes. It is, of course, understood that in referring to the chain and the arch, these structures are of substantially lateral width depending upon the dimensions of the bridge, the chains usually extending in multiple and the arch structure being built up with lateral members. Referring to Figs. 13 and 14, the construction is shown as illustrated at the left-hand pier 1 where the bearings, both for the arch and the towers, are fixed, and placed independently one from another. The tower 19 comprises upright columns united by lateral braces 75 having at their upper ends saddles with curved seats through which run freely the cables constituting the chain 25. This tower structure at its lower end pivots on curved seats 76 formed on the bearing blocks 77 mounted on the pier. The arch section 4, shown in duplicate and united by cross members 78, carries the floor structure 79 with the side-walks 80 and is pivoted on bearing blocks 81 mounted on the pier. These bearing blocks are shown in Figs. 15 and 16 more in detail where the pivotal connection 6 between the central arch section 4 and the side arch section 12 is illustrated.

The sliding bearing construction, when employed for the end of the central arch, may be of suitable construction, such, for example, as illustrated in Fig. 17. Here the pier 2 carries a base 82, on which are the rollers 9 supporting the sliding bearing 8 for the pivotal connection 7 between the central arch section 5 and the side arch section 13, as illustrated in Figs. 1 and 11.

The central pivotal connection between the arch sections, such as shown in Figs. 1 and 11, is shown in Fig. 18.

The construction at the abutments is shown in a preferred form in Fig. 19 where a construction shown diagrammatically at the left of Fig. 1 in particular is illustrated. In this construction a transverse beam 14 on the side arch truss 12 rests on rollers 15 on a plate 85 on the abutment. The anchor rods 16 extend well down into the abutment 10 and are secured to an anchored beam 86 embedded therein. These anchor rods 16 at their upper ends are pivotally connected to a transverse beam 87 resting on rollers 15 on top of the beam 14. Thus it will be seen that the arch or truss member 12 may slide endwise freely and still be held against vertical movement. The chain 25 is shown as provided with an adjustable connection at its end and pivoted at the point 26 to the end of the truss or arch member 12. It will be noted in this case that the angle between the chain and the horizontal is comparatively slight, so that, as already pointed out, the component of the force exerted on the anchor rods 16 is minimized.

A slightly different arrangement of the chain feature of the bridge of this invention, involving the invention in its broader aspects, is illustrated in Figs. 20 and 21. Herein the towers 88 and 89 are shown as immovably fixed on their respective piers 1 and 2. In the construction thus illustrated the bases of the respective towers are secured in place by bolts 90 passing through the bases and embedded in the structure of the piers. The chain 25 reaves through the saddle at the top of the pier or in addition a sliding bearing may be provided at the top of the pier, as shown in Fig. 8. The arch element comprising the central main arch and the strut or side arch sections may take any of the forms already described.

It will be seen that in the present invention the stiffening truss or arch element of the bridge acts as an arch with a horizontal thrust and consequently that the loading is not transmitted fully to the chain, as in an ordinary suspension bridge, but is distributed between the chain or suspension element and the arch element in proportion to the rise of the arch and the drop of the chain, thus evoking a horizontal stress in the chain that is equal to the horizontal thrust in the arch. With this principle of construction the horizontal stress of the chain is less than in an ordinary suspension bridge and, for instance, as already pointed out, twice less if the rise of the arch and the drop of the chain are equal. This gives a very considerable diminution of the weight of the chain as compared with that in an ordinary suspension bridge.

Having thus described the invention, what is claimed as new, and desired to be secured by Letters Patent, is:

1. A combined suspension and arch bridge comprising two piers, an arch having a fixed bearing on one pier and a sliding bearing on the other pier, fixed tower bearings on the piers, towers pivotally mounted on the tower bearings, abutments at the ends of the bridge, vertically anchored sliding bearings on the abutments, side strut members pivotally connected to the ends of the arch and to the respective sliding bearings on the abutments, a chain extending over and depending between the towers, the ends of the chain being connected to the ends of the respective strut members, and a plurality of vertical stress members connecting the arch and strut members and the chain at regular intervals.

2. A combined suspension and arch bridge comprising two piers, an arch having a fixed bearing on one pier and a sliding bearing on the other pier, fixed tower bearings on the piers, towers pivotally mounted on the tower bearings, abutments at the ends of the bridge, vertically anchored sliding bearings on the abutments, side strut members pivotally connected to the ends of the arch and to the respective sliding bearings on the abutments, a chain extending over and depending between the towers, the ends of the chain being connected to the ends of the respective strut members, and a plurality of vertical stress members connecting the arch and chain at regular intervals.

3. A combined suspension and arch bridge comprising two piers, an arch having a fixed bearing on one pier and a sliding bearing on the other pier, fixed tower bearings on the piers, towers pivotally mounted on the tower bearings, abutments at the ends of the bridge, vertically anchored sliding bearings on the abutments, a side arch section at each end of the bridge pivotally connected to the end of the arch and secured to the sliding bearing on the adjacent abutment, a chain extending over and depending between the towers, the ends of the chain being connected to the ends of the respective side arch sections, and a plurality of vertical stress members connecting the arch and side arch sections and the chain at regular intervals.

4. A combined suspension and arch bridge comprising two piers, an arch having a fixed bearing on one pier and a sliding bearing on the other pier, fixed tower bearings on the piers, towers pivotally mounted on the tower bearings, abutments at the ends of the bridge, vertically anchored sliding bearings on the abutments, a side arch section at each end of the bridge connected to the end of the arch and secured to the sliding bearing on the adjacent abutment, a chain extending over and depending between the towers, the ends of the chain being connected to the ends of the respective side arch sections, and a plurality of vertical stress members connecting the arch and side arch sections and the chain at regular intervals.

5. A combined suspension and arch bridge comprising the construction defined in claim 1, in which the arch is in two sections pivotally connected at its center.

6. A combined suspension and arch bridge comprising the construction defined in claim 2, in which the arch is in two sections pivotally connected at its center.

7. A combined suspension and arch bridge comprising the construction defined in claim 3, in which the arch is in two sections pivotally connected at its center.

8. A combined suspension and arch bridge comprising the construction defined in claim 4, in which the arch has a central pivot joint and pivotal joints at each side of the center.

9. A combined suspension and arch bridge comprising the construction defined in claim 4, in which the arch has a central pivotal joint and each side arch section has a pivotal joint near the pier.

10. A combined suspension and arch bridge comprising two piers, an arch having a fixed bearing on one pier and a sliding bearing on the other pier, fixed tower bearings on the piers, towers pivotally mounted on the tower bearings, abutments at the ends of the bridge, vertically anchored sliding bearings on the abutments, side strut members pivotally connected to the ends of the arch and to the respective sliding bearings on the abutments, a chain extending over and depending between the towers, the ends of the chain being connected to the respective strut members, and a plurality of vertical stress members connecting the arch and strut members and the chain at regular intervals.

11. A combined suspension and arch bridge comprising two piers, an arch having a fixed bearing on one pier and a sliding bearing on the other pier, fixed tower bearings on the piers, towers pivotally mounted on the tower bearings, abutments at the ends of the bridge, a vertically anchored sliding bearing on one abutment, a side strut member pivotally connected to the sliding bearing of the arch and to the sliding bearing on the abutment, a chain extending over and depending between the towers, one end of which is connected to the end of the strut member and the other end of which is anchored to the other abutment.

12. A combined suspension and arch bridge comprising two piers, an arch having a fixed bearing on one pier and a sliding bearing on the other pier, towers mounted on the piers, abutments at the ends of the bridge, vertically anchored sliding bearings on the abutments, side strut members pivotally connected to the ends of the arch and to the respective sliding bearings on the abutments, a chain extending over and depending between the towers, the ends of the chain being connected to the ends of the respective strut members, and a plurality of vertical stress members connecting the arch and strut members and the chain at regular intervals.

13. A combined suspension and arch bridge comprising two piers, an arch having a fixed bearing on one pier and a sliding bearing on the other pier, towers mounted on the piers, abutments at the ends of the bridge, vertically anchored sliding bearings on the abutments, side strut members pivotally connected to the ends of the arch and to the respective sliding bearings on the abutments, a chain extending over and depending between the towers, the ends of the chain being connected to the ends of the respective strut members, and a plurality of vertical stress members connecting the arch and chain at regular intervals.

14. A combined suspension and arch bridge comprising two piers, an arch having a fixed bearing on one pier and a sliding bearing on the other pier, towers mounted on the piers, abutments at the ends of the bridge, vertically anchored sliding bearings on the abutments, side strut members pivotally connected to the ends of the arch and to the respective sliding bearings on the abutments, a chain extending over and depending between the towers, the ends of the chain being connected to the respective strut members, and a plurality of vertical stress members connecting the arch and chain at regular intervals.

15. A combined suspension and arch bridge comprising two piers, an arch having a fixed bearing on one pier and a sliding bearing on the other pier, towers mounted on the piers, abutments at the ends of the bridge, a vertically anchored sliding bearing on one abutment, a side strut member pivotally connected to the sliding bearing of the arch and to the sliding bearing on the abutment, a chain extending over and depending between the towers, one end of which is connected to the strut member and the other end of which is anchored to the other abutment.

In testimony whereof, I have signed my name to this specification.

GREGORY G. KRIVOSHEIN.